US009587668B2

(12) United States Patent
Jia et al.

(10) Patent No.: US 9,587,668 B2
(45) Date of Patent: Mar. 7, 2017

(54) PIN RETENTION SYSTEM

(71) Applicant: Harnischfeger Technologies, Inc., Wilmington, DE (US)

(72) Inventors: Wei Jia, Chesterbrook, PA (US); Jeff Schwake, Oshkosh, WI (US)

(73) Assignee: Harnischfeger Technologies, Inc., Wilmington, DE (US)

( * ) Notice: Subject to any disclaimer, the term of this patent is extended or adjusted under 35 U.S.C. 154(b) by 56 days.

(21) Appl. No.: 14/201,210

(22) Filed: Mar. 7, 2014

(65) Prior Publication Data

US 2014/0270913 A1 Sep. 18, 2014

Related U.S. Application Data

(60) Provisional application No. 61/777,665, filed on Mar. 12, 2013.

(51) Int. Cl.

| | |
|---|---|
| ***F16C 11/06*** | (2006.01) |
| ***F16D 3/00*** | (2006.01) |
| ***F16C 11/04*** | (2006.01) |
| ***F16C 11/02*** | (2006.01) |
| ***F16B 21/16*** | (2006.01) |

(52) U.S. Cl.

CPC .............. *F16C 11/04* (2013.01); *F16B 21/16* (2013.01); *F16C 11/02* (2013.01); *F16C 11/045* (2013.01); *F16C 2350/26* (2013.01); *Y10T 29/49826* (2015.01); *Y10T 403/32951* (2015.01)

(58) Field of Classification Search

CPC ......... Y10T 29/32951; Y10T 29/49826; F16B 21/16; F16B 43/007; F16B 37/0892; F16C 11/02; F16C 11/04; F16C 11/045; F16C 2350/26

USPC ......... 411/539; 403/154, 161, 166, 317, 324

See application file for complete search history.

(56) References Cited

U.S. PATENT DOCUMENTS

| | | | | | |
|---|---|---|---|---|---|
| 1,652,272 | A * | 12/1927 | Dawson | .................. | F16B 21/16 411/519 |
| 1,784,667 | A * | 12/1930 | Gillet | ...................... | F16B 21/16 285/415 |
| 2,774,508 | A | 12/1956 | Larsen | | |
| 3,003,836 | A | 10/1961 | Hill | | |
| 4,097,167 | A | 6/1978 | Stratienko | | |
| 4,282,664 | A * | 8/1981 | Thiele | ...................... | E02F 3/40 37/444 |
| 4,459,061 | A | 7/1984 | Klement | | |
| 4,624,585 | A * | 11/1986 | Nix | ......................... | B25B 27/28 384/295 |
| 4,629,353 | A * | 12/1986 | Burke | ..................... | E02F 9/006 29/898.054 |
| 4,668,115 | A * | 5/1987 | Ferris | ...................... | B64C 27/48 403/24 |
| 4,815,908 | A | 3/1989 | Duran et al. | | |
| 4,918,843 | A * | 4/1990 | Kiesewetter | .......... | E02F 9/2841 267/141 |

(Continued)

*Primary Examiner* — Gregory Binda
*Assistant Examiner* — Nahid Amiri
(74) *Attorney, Agent, or Firm* — Michael Best & Friedrich LLP

(57) ABSTRACT

A pin retention system includes a pin having a circumferential groove disposed along the pin, and a plurality of retention elements sized to sit within the circumferential groove, each of the retention elements including a plurality of holes. The system also includes a plurality of dowels sized to slide within the holes in the retention elements.

20 Claims, 3 Drawing Sheets

10 14 18 22 26 30 34 36 38 42 44 46 48 50 52 54 58 62 66 70 74 78 82 86 90 94 98 102 106 128

(56) References Cited

U.S. PATENT DOCUMENTS

| | | | | |
|---|---|---|---|---|
| 5,046,881 | A * | 9/1991 | Swager | F16D 25/082<br>403/154 |
| 5,056,805 | A * | 10/1991 | Wang | B62B 9/20<br>280/47.36 |
| 5,076,747 | A | 12/1991 | Cosenza | |
| 5,597,260 | A * | 1/1997 | Peterson | F16B 21/04<br>403/316 |
| 5,607,037 | A | 3/1997 | Yarnell et al. | |
| 5,738,195 | A | 4/1998 | Gluys et al. | |
| 7,204,668 | B2 | 4/2007 | Le | |
| 8,186,900 | B2 * | 5/2012 | Riley | F04B 53/147<br>267/166 |
| 8,308,577 | B2 | 11/2012 | Braun et al. | |
| 8,322,643 | B2 | 12/2012 | Gervais et al. | |
| 8,579,510 | B2 * | 11/2013 | Noble | F16F 1/3842<br>267/293 |
| 8,616,038 | B2 * | 12/2013 | Breen | B21D 37/12<br>72/350 |
| 2008/0042007 | A1 * | 2/2008 | Machado | B64D 27/26<br>244/54 |
| 2012/0224387 | A1 * | 9/2012 | Moore | F42B 8/02<br>362/553 |

* cited by examiner

PIN RETENTION SYSTEM

CROSS-REFERENCE TO RELATED APPLICATIONS

This application claims priority to U.S. Provisional Application No. 61/777,665, filed Mar. 12, 2013, the entire contents of which are incorporated herein by reference.

FIELD OF THE INVENTION

The present invention relates to a pin retention system, and more particularly to a pin retention system for use with mechanical components on an industrial mining machine.

BACKGROUND OF THE INVENTION

Industrial mining machines, such as electric rope or power shovels, draglines, etc., are used to execute digging operations to remove material from a bank of a mine. During that process, the machines employ various large mechanical components (e.g., a boom, a boom handle, a dipper, a dipper door, etc.). The industrial machines include a variety of pins that connect the various mechanical components of the machines. The pins often serve as pivot points about which the mechanical components pivot relative to one another. The pins are typically elongated cylindrical structures, and extend through openings in the mechanical components. The pins are configured to withstand shear stresses generated by movement of the various mechanical machine components.

Current pin retention systems for holding the pins in place between the mechanical components include collars located at opposite ends of the pins, and bolts extending through the collars to fasten the collars to the pins. The collars inhibit axial movement of the pins, and prevent the pins from sliding out of the openings through which the pins are inserted.

SUMMARY

In accordance with one construction, a pin retention system includes a pin having a circumferential groove disposed along the pin, and a plurality of retention elements sized to sit within the circumferential groove, each of the retention elements including a plurality of holes. The system also includes a plurality of dowels sized to slide within the holes in the retention elements.

In accordance with another construction, a pin retention system includes a pin having a first end, a second end, a first circumferential groove disposed between the first and second ends, and a second circumferential groove disposed between the first and second ends. The pin retention system also includes a plurality of retention elements sized to sit within the first and second circumferential grooves.

In accordance with another construction, a method of assembling a pin retention system includes inserting a plurality of retention elements into a circumferential groove on a pin, each of the first plurality of retention element including a plurality of holes, and inserting a plurality of dowels through the holes in the plurality of retention elements.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
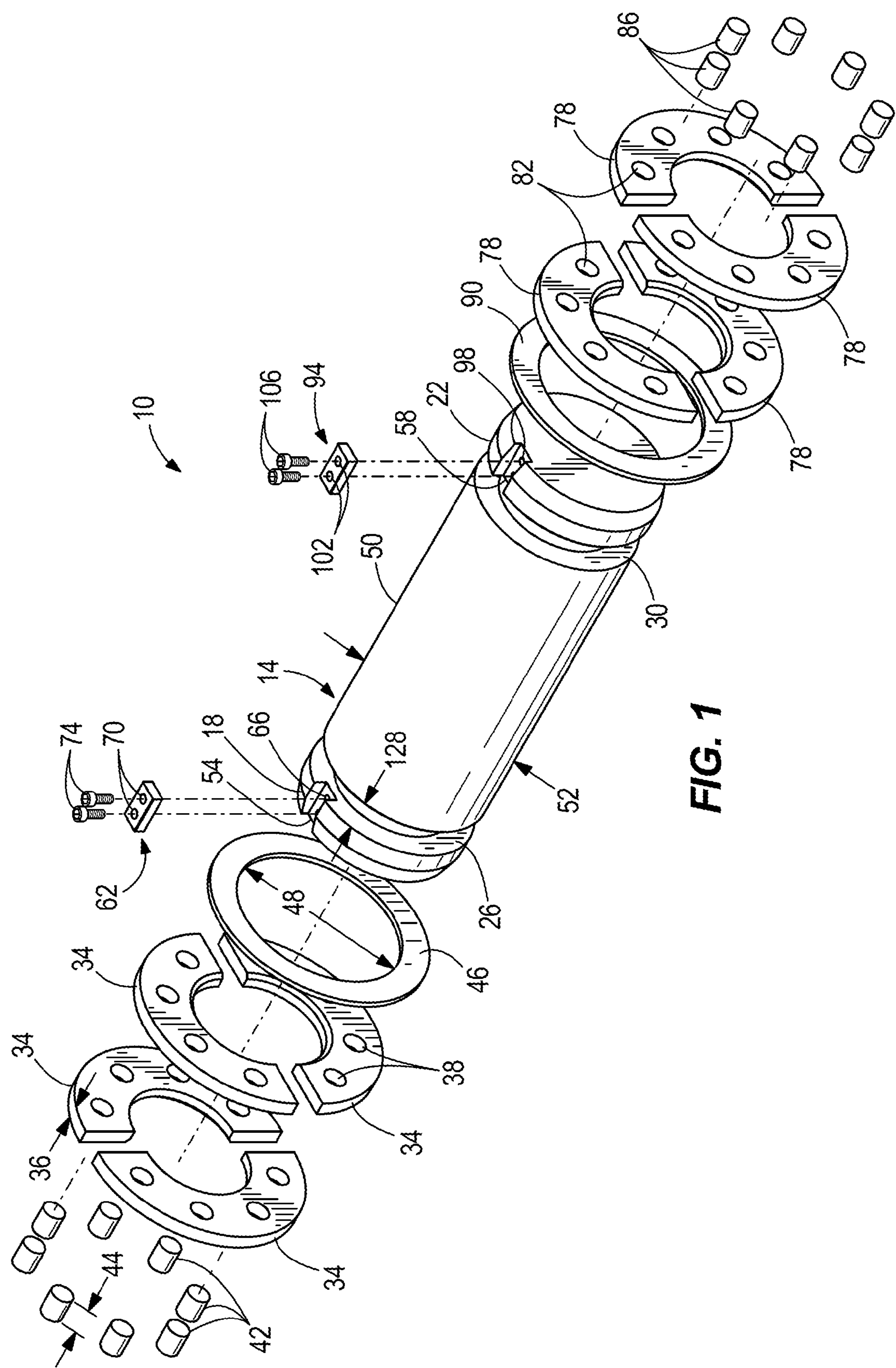
FIG. 1 is a top perspective view of a pin retention kit according to a construction of the invention.

FIG. 1 is a top perspective view of a pin retention system 10. The pin retention system 10 includes a pin 14. The pin 14 has an elongate, cylindrical structure, though other constructions of the pin 14 have different shapes and configurations. The pin 14 has a first end 18 and a second end 22. A first groove 26 is disposed proximate the first end 18, and a second groove 30 is disposed proximate the second end 22. The first and second grooves 26, 30 extend circumferentially about the pin 14. The first groove 26 and the second groove 30 are formed in the pin 14 during manufacture of the pin 14. However, in some constructions, the pin retention system 10 does not include a pin 14. Rather, the pin retention system 10 is provided as a kit where an existing pin 14 is retrofitted, and the first and second grooves 26, 30, are formed into the already existing pin 14. Examples of types of pins 14 that benefit from the system 10 include, but are not limited to, a dipper door pin, a dipper bail pin, a suspension rope pin, a spherical ball pin, and a snubber pin on an industrial mining machine. However, any pin that connects two mechanical components and needs to be restrained from axial movement can benefit from the system 10.

With continued reference to FIG. 1, the pin retention system 10 includes first retention elements 34. Four retention elements 34 are illustrated, though other constructions include different numbers of retention elements 34. The retention elements 34 are sized and shaped to sit within the first groove 26. Each of the retention elements 34 has an arcuate shape and a width 36. Each retention element 34 extends approximately 180 degrees. Other constructions of the retention elements 34 include different shapes and sizes than those shown in FIG. 1. The retention elements 34 include holes 38, which are spaced generally evenly along the retention elements 34 and extend through the retention elements 34. Each retention element 34 includes four holes 38, though other constructions include different numbers of holes.

With continued reference to FIG. 1, the pin retention system 10 also includes dowels 42. The dowels 42 are any structures configured to slide within the holes 38 (e.g., pins, bolts, etc.). Eight dowels 42 are illustrated, though other constructions include different numbers of dowels 42. Each of the dowels 42 has a length 44. The length 44 of each dowel 42 is approximately equal to twice a width 45 (FIG. 4) of one of the retention elements 34.

With continued reference to FIG. 1, the pin retention system 10 also includes a first washer 46. The first washer 46 is configured to sit adjacent the first retention elements 34 within the first groove 26. The first washer 46 has an inner diameter 48, and the pin 14 includes a middle portion 50 having an outer diameter 52. The inner diameter 48 of the first washer 46 is less than the outer diameter 52 of the middle portion 50, such that the first washer 46 abuts the middle portion 50 when placed in the first groove 26.

With continued reference to FIG. 1, the pin 14 includes a third groove 54 and a fourth groove 58. The third groove 54 is located proximate the first end 18, and the fourth groove 58 is located proximate the second end 22. The third groove 54 extends axially along the pin 14 between the first groove 26 and first end 18, and the fourth groove 58 extends axially along the pin 14 between the second groove 30 and the second end 22. The pin retention system 10 includes a first stop member 62 that sits within the third groove 54. The first stop member 62 has a generally rectangular shape, though other constructions include different shapes and sizes than that shown in FIG. 1.

Figure 3:
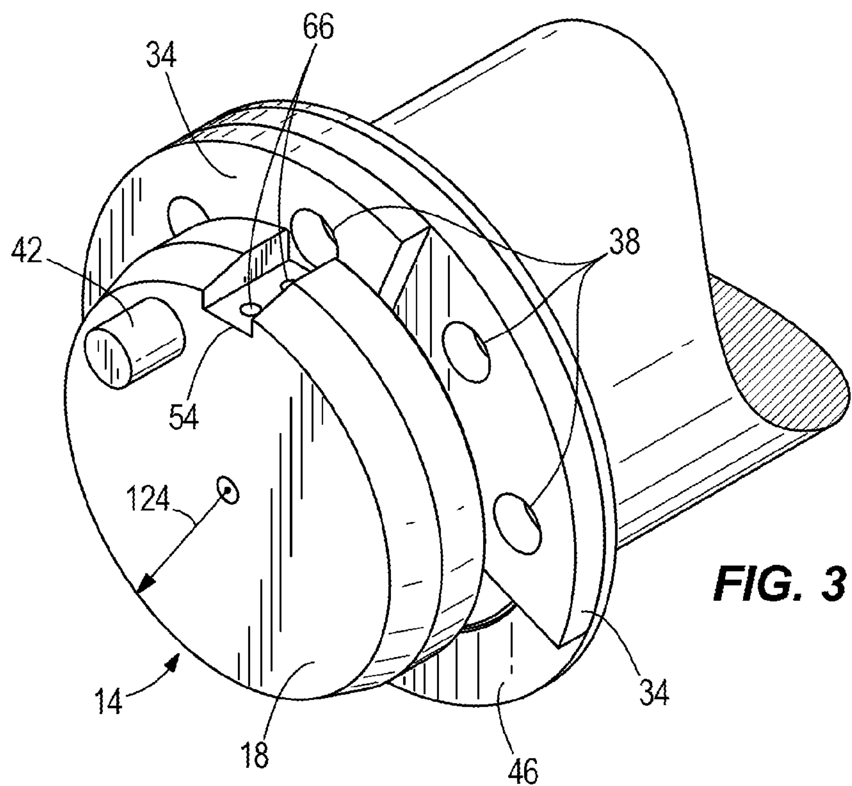
FIGS. 3 and 4 are enlarged, partial top perspective views of the pin retention kit of FIG. 1, illustrating a method of assembling the kit.
Figure 4:
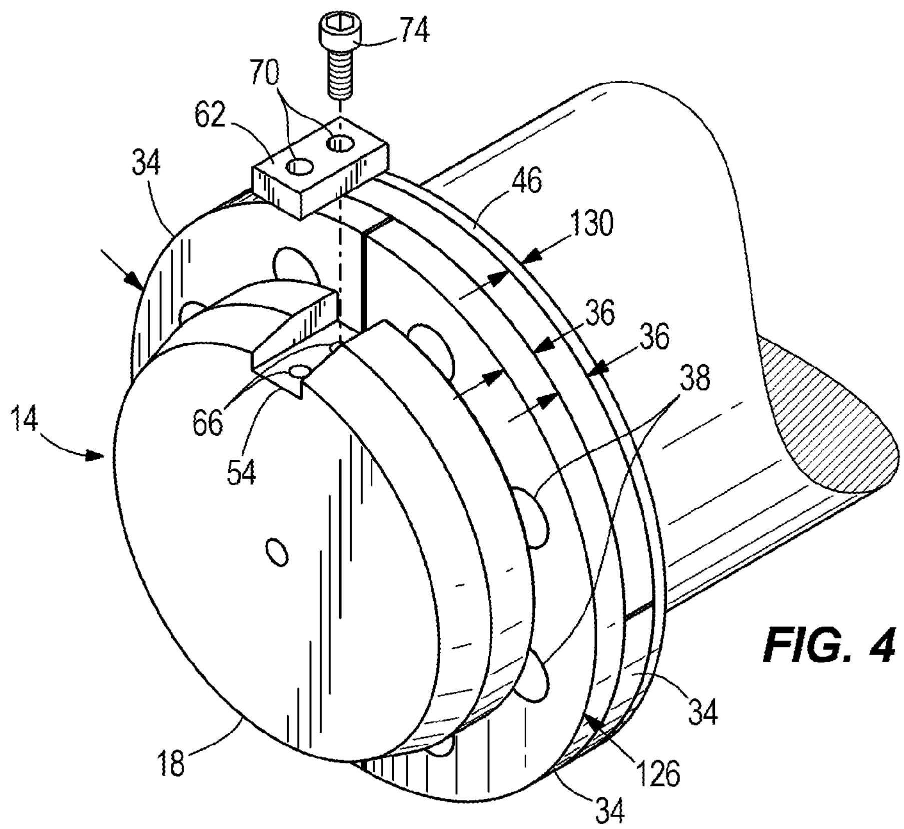

As illustrated in FIGS. 3 and 4, the third groove 54 includes holes 66 extending into the pin 14 along the bottom of the third groove 54, and the first stop member 62 includes holes 70 extending through the first stop member 62. The pin retention system 10 includes fasteners 74 that couple the first stop member 62 to the pin 14. The fasteners 74 pass through the holes 70, 66 and rigidly fasten the first stop member 62 to the pin 14.

With continued reference to FIG. 1, the pin retention system 10 also includes second retention elements 78. Four retention elements 78 are illustrated, though other constructions include different numbers of retention elements 78. The retention elements 78 are sized and shaped to sit within the second groove 30. Each of the retention elements 78 has an arcuate shape, and a width equal to the width 45 of retention elements 34. Each of the retention elements 78 extends approximately 180 degrees. Other constructions of the retention elements 78 include different shapes and sizes than those shown in FIG. 1. The retention elements 78 include holes 82. The holes 82 are spaced generally evenly along the retention elements 78, and extend through the retention elements 78. Each retention element 78 includes four holes 82, though other constructions include different numbers of holes.

With continued reference to FIG. 1, the pin retention system 10 also includes second dowels 86. The dowels 86 are any structure configured to slide within the holes 82. Eight dowels 86 are illustrated, though other constructions include different numbers of dowels 86. Each of the dowels 86 has a length equal to the dowels 42. (i.e., the length of each dowel 86 is approximately equal to twice the width of one of the retention elements 78).

With continued reference to FIG. 1, the pin retention system 10 also includes a second washer 90. The second washer 90 sits adjacent the second retention elements 78 within the second groove 30. The second washer 90 has an inner diameter similar to the inner diameter of the first washer 46 (i.e., an inner diameter that is less than the outer diameter of the middle portion 50 of the pin 14) such that the second washer 90 abuts the middle portion 50 without passing over the middle portion 50.

With continued reference to FIG. 1, the pin retention system 10 also includes a second stop member 94 that sits within the fourth groove 58. The second stop member 94 has a generally rectangular shape, though other constructions include different shapes and sizes than that shown in FIG. 1. The fourth groove 58 includes holes 98, and the second stop member 94 includes holes 102. The pin retention system 10 further includes fasteners 106 that are configured to couple the second stop member 94 to the pin 14. The fasteners 106 pass through the holes 102, 98, and rigidly fasten the second stop member 94 to the pin 14.

Figure 2:
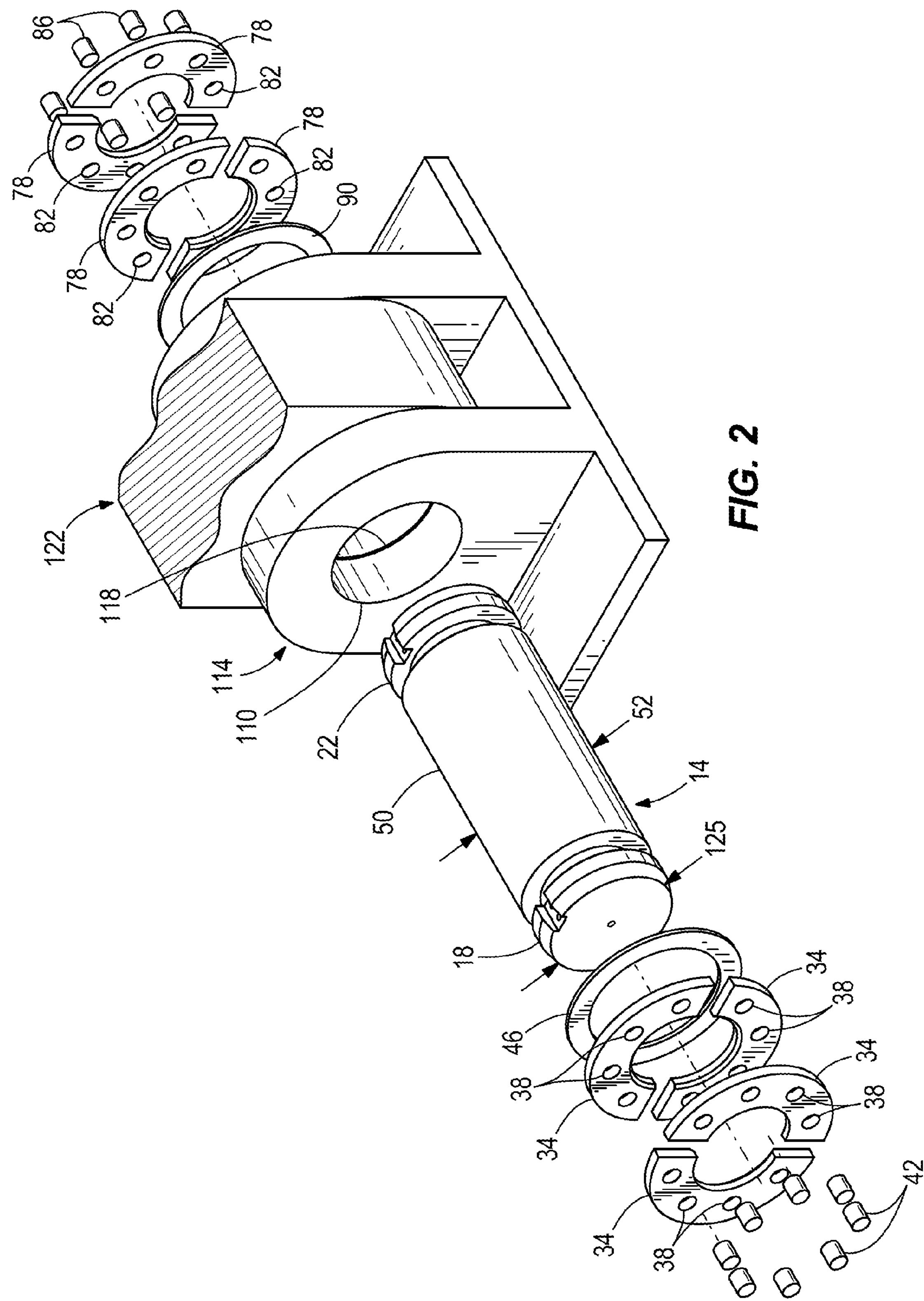
FIG. 2 is a top perspective view of the pin retention kit of FIG. 1, and further illustrating first and second machine components.

With reference to FIGS. 2-4, a method of using the pin retention system 10 is illustrated. The method initiates by inserting the pin 14 through at least one opening 110 (shown in FIG. 2) on a first mechanical component 114, and through at least one opening 118 (shown in FIG. 2) on a second mechanical component 122, so as to couple the first and second mechanical components 114, 122 together. When the pin 14 is inserted, the first groove 26 and the second groove 30 remain exposed outside of the openings 110, 118. The first and second mechanical components include, but are not limited to a boom and frame, gear and frame, gantry equalizer, A-frame, and dragline walk leg. However, any combination of mechanical components that utilize a pin to connect the two mechanical components, and wherein the pin needs to be restrained from axial movement, can benefit from the system 10.

With reference to FIG. 3, with the pin 114 inserted through the openings 110, 118, the first washer 46 is inserted into the first groove 26, and the first retention elements 34 are coupled to the pin 14. To couple the first retention elements 34 to the pin, one of the retention elements 34 is placed within the first groove 26. Another of the retention elements 34 is then placed within the first groove 26, axially disposed from the first retention element 34, such that the second-placed retention element 34 partially overlaps the first-placed retention element 34 (as shown in FIG. 3). The two retention elements 34 are offset by 90 degrees when in the first groove 26, such that two of the holes 38 on the first-placed retention element 34 are aligned with two of the holes 38 on the second-placed retention element 34. With the retention elements 34 aligned and held in place, the pin 14 is turned (or alternatively, the pin 14 is held in place and the retention elements 34 are turned), until the third groove 54 is aligned with one of the two sets of aligned holes 38.

As illustrated in FIG. 3, the first end 18 of the pin 14 has a radius 124 that is greater than a radial spacing of the holes 38 relative to a longitudinal axis of the pin 14. Thus, the holes 38 are at least partially covered by the end of the pin 14 when the retention elements 34 sit within the groove 26. A hole 38 is only uncovered when the pin 14 is rotated, relative to the retention elements 34, to a location where the third groove 54 is aligned with one of the holes 38, as illustrated in FIG. 3.

With continued reference to FIG. 3, with the third groove 54 aligned with the holes 38, one of the dowels 42 is inserted through the third groove 54 and into the two axially aligned holes 38. As noted above, the dowel 42 has a length equal to approximately twice the width 36 of one of the retention elements 34. Therefore, the dowel 42 is able to fit into the holes 38, such that the dowel 42 is nested within the retention elements 34, without sticking out of the retention elements 34. In this manner, the dowel 42 acts to couple the first-placed retention element 34 to the second-placed retention element 34.

With the retention elements 34 coupled together with the dowel 42, the pin 14 is rotated further, relative to the retention elements 34, until a second set of axially aligned holes 38 are exposed. With the second set of aligned holes 38 exposed, another dowel 42 is inserted through the third groove 54 and into the holes 38, thereby further coupling the two retention elements 34.

With the first and second retention elements 34 coupled together with two dowels 42, a third of the four retention elements 34 is inserted into the first groove 26, axially disposed from the second retention element 34. Similar to the configuration illustrated in FIG. 3, the third-placed retention element 34 is offset by 90 degrees relative to the second-placed retention element 34, such that two of the holes 38 on the second-placed retention element 34 are axially aligned with two of the holes 38 on the third-placed retention element 34. Dowels 42 are inserted into the aligned holes 38 in a manner similar to that described above, until the three retention elements 34 are coupled together.

Next, a last of the four retention elements 34 is then inserted into the first groove 26, axially disposed from the first and third retention elements 34. Similar to the configuration illustrated in FIG. 3, the fourth-placed retention element 34 is offset by 90 degrees relative to the third-placed, as well as the first-placed, retention elements 34, such that two of the holes 38 on the third-placed retention element 34 are axially aligned with two of the holes 38 on the fourth-placed retention element 34, and two of the holes 38 on the first-placed retention element 34 are axially aligned with two of the holes on the fourth-placed retention element 34. Dowels 42 are then inserted into the aligned holes 38 in a manner similar to that described above, until all four retention elements 34 are all coupled together.

As illustrated in FIG. 4, with the retention elements 34 coupled together with the dowels 42, the first stop member 62 is seated in the groove 54 and coupled to the pin 14 by the fasteners 74. The stop member 62 prevents the dowels 42 from extending back out of the holes 38. Additionally, the first end 18 of pin 14 has a diameter 125 that is less than the diameter 52 of the middle portion 50. Thus, the middle portion 50 and the first washer 46 prevent the dowels 38 from extending out the other side of the holes 38 (i.e., towards the middle portion 50). The dowels 42 are trapped in place between the retention elements 34 within the first groove 26, creating an overall ring of retention elements 34 that are coupled to one another and sit within the first groove 26. The retention elements 34 are able to rotate relative to the pin 14, but are restrained from being pulled apart because of the dowels 42.

With the first set of retention elements 34 fully assembled, the second set of retention elements 78 are then assembled in the second groove 30. Specifically, the second washer 90 is inserted into the second groove 30, and the second retention elements 78 are coupled to the pin 14 in a manner identical to the first retention elements 34, which is described above. For example, one of the retention elements 78 is placed within the groove 30, and another of the second retention elements 78 is then placed within the groove 30, such that the second-placed retention element 78 partially overlaps the first-placed retention element 78. The two retention elements 78 are offset by 90 degrees within the groove 30, such that two of the holes 82 on the first-placed retention element 78 are aligned with two of the holes 82 on the second-placed retention element 78. With the two retention elements 78 aligned and held in place, the pin 14 is turned (or alternatively, the pin 14 is held in place and the retention elements 78 are turned), until the fourth groove 58 is aligned with one of the two sets of aligned holes 82. The dowels 86 are then inserted into the retention elements 78, and further retention elements 78 are added, until all four retention elements 78 are coupled to one another with the dowels 86, and the second stop member 94 is coupled to the pin 14.

With reference to FIG. 4, the retention elements 34 (and similarly, retention elements 78) form an outer diameter 126 that is greater than the diameters of the openings 110 on the first mechanical component 114. Thus, the retention elements 34, 78 serve to keep the pin 14 in place and prevent the pin 14 from being axially pulled out of the openings 110.

With reference to FIGS. 1 and 4, the groove 26 has a width 128 slightly greater than the combination of a width of two seated retention elements 34 (or 78) and a width 130 of one of the washers 46, 90. Thus, while the retention elements 34, 78 are allowed to rotate about the pin 14, the retention elements 34, 78 are also able to flex or rotate slightly within the grooves 26, 30, either toward or away from the openings 110. This provides some added flexibility to the overall pin retention system 10.

Advantageously, the pin retention system 10 does not use bolts that are subjected to axial loading. In current pin retention systems, bolts that pass through the collars are subjected to axial loading that occurs when a pin tries to move out of the holes 110, 118. This axial loading creates shear stresses in the bolts that often fracture the bolts, leading to undesirably high levels of maintenance and repair, and/or part replacement. The current pin retention system 10 instead uses retention elements 34, 78 that are held in place by internal dowels 42, 86. The dowels 42, 86 are not subjected to any shear stresses like the bolts in current systems, and are held in place by the retention elements 34, 78 themselves and the stop members 62, 94. Any axial loading experienced by the pin 14 that may try to push the pin 14 out of the holes 110, 118, is absorbed by the ring of retention elements 34, 78 as the ring of retention elements 34, 78 presses against the mechanical components 114, 122.

Although the invention has been described in detail with reference to certain preferred embodiments, variations and modifications exist within the scope and spirit of one or more independent aspects of the invention as described.

The invention claimed is:

1. A pin retention system comprising:

a pin having a circumferential groove disposed along the pin;

a plurality of retention elements sized to sit within the circumferential groove, each of the retention elements including a plurality of holes; and a plurality of dowels sized to slide within the holes in the retention elements;

wherein the plurality of retention elements includes four retention elements sized to sit within the circumferential groove;

wherein each the four retention elements is arcuate, extends 180 degrees, and is offset relative to another of the four retention elements by 90 degrees within the circumferential groove when the four retention elements are within the circumferential groove.

2. The pin retention system of claim 1, further comprising a washer sized to fit within the circumferential groove.

3. The pin retention system of claim 1, wherein the pin includes an end, and wherein at least one of the holes in one of the four retention elements is partially covered by the end of the pin when the retention element is within the circumferential groove.

4. The pin retention system of claim 1, wherein each of the dowels has a length equal to approximately twice a width of one of the retention elements.

5. The pin retention system of claim 1, wherein the pin includes an end, an axial groove extending between the circumferential groove and the end of the pin, and a first stop member sized to sit within the axial groove.

6. The pin retention system of claim 1, wherein each the four retention elements is configured to be inserted into the circumferential groove radially.

7. The pin retention system of claim 6, wherein two of the four retention elements are configured to be inserted into the circumferential groove at a first axial position along the pin, and the other two retention elements are configured to be inserted into the circumferential groove at a second, different axial position along the pin.

8. A method of assembling a pin retention system comprising:

inserting a plurality of retention elements into a circumferential groove on a pin, each of the plurality of retention elements including a plurality of holes;

inserting a plurality of dowels through the holes in the plurality of retention elements; and inserting a stop member into an axial groove on the pin and fastening the stop member to the pin to prevent the dowels from moving out of the holes of the retention members.

9. The method of claim 8, wherein the step of inserting the plurality of retention elements includes inserting a first retention element into the circumferential groove and inserting a second retention element into the circumferential groove, the second retention element being axially disposed from the first retention element and partially overlapping the first retention element, such that one of the holes of the first retention element is axially aligned with one of the holes of the second retention element.

10. The method of claim 9, wherein the step of inserting the dowels includes inserting a dowel through the aligned holes of the first and second retention elements to couple the first and second retention elements together.

11. The method of claim 10, wherein the step of inserting the plurality of retention elements further includes inserting a third retention element into the circumferential groove such that the third retention element is axially disposed from the second retention element and the third retention element partially overlaps the second retention element, and such that one of the holes of the third retention element is axially aligned with one of the holes of the second retention element.

12. The method of claim 11, wherein the step of inserting the dowels includes inserting a dowel through the aligned holes of the second retention element and the third retention element to couple the second and third retention elements together.

13. The method of claim 12, wherein the step of inserting the plurality of retention elements further includes inserting a fourth retention element into the circumferential groove such that the fourth retention element is axially disposed from both the first retention element and the third retention element and partially overlaps both the first and third retention elements, and such that one of the holes on the fourth retention element aligns with one of the holes on the first retention element, and another one of the holes on the fourth retention element aligns with one of the holes on the third retention element.

14. The method of claim 13, wherein the step of inserting the dowels includes inserting dowels through the aligned holes of the first, third, and fourth retention elements.

15. The method of claim 14, wherein the circumferential groove is a first circumferential groove and the plurality of retention elements are a first plurality of retention elements, and wherein the method further comprises inserting a second plurality of retention elements into a second circumferential groove on the pin, the second plurality of retention elements including a fifth, sixth, seventh, and eighth retention element, each of the fifth, sixth, seventh, and eighth retention elements being inserted into the second circumferential groove such that each of the fifth, sixth, seventh, and eighth retention elements partially overlaps at least one of the other of the fifth, sixth, seventh, and eighth retention elements, and further comprising inserting dowels through holes in the fifth, sixth, seventh, and eight retention elements.

16. The method of claim 15, wherein the axial groove is a first axial groove and the stop member is a first stop member, and wherein the method further comprises inserting a second stop member into a second axial groove on the pin and fastening the second stop member to the pin to prevent the dowels from moving out of the holes of the fifth, sixth, seventh, and eight retention elements.

17. The method of claim 15, further comprising forming the first and second circumferential grooves into the pin.

18. A pin retention system comprising:

a pin having a circumferential groove disposed along the pin;

a plurality of retention elements sized to sit within the circumferential groove, each of the retention elements including a plurality of holes; and a plurality of dowels sized to slide within the holes in the retention elements;

wherein the pin includes an end, an axial groove extending between the circumferential groove and the end of the pin, and a first stop member sized to sit within the axial groove.

19. The pin retention system of claim 18, further comprising a washer sized to fit within the circumferential groove.

20. The pin retention system of claim 18, wherein each of the dowels has a length equal to approximately twice a width of one of the retention elements.

* * * * *